United States Patent [19]

Tremblay

[11] Patent Number: 4,909,291
[45] Date of Patent: Mar. 20, 1990

[54] CUTTING HEAD FOR A TREE-FELLING VEHICLE

[75] Inventor: Rejean Tremblay, St. Felicien, Canada

[73] Assignee: Les Operations Forestieres Rejean Tremblay Inc., St. Felicien, Canada

[21] Appl. No.: 302,134

[22] Filed: Jan. 6, 1989

Related U.S. Application Data

[63] Continuation-in-part of Ser. No. 107,470, Oct. 13, 1987, abandoned.

[30] Foreign Application Priority Data

Aug. 31, 1987 [CA] Canada ................................. 545719

[51] Int. Cl.$^4$ ............................................. A01G 23/08
[52] U.S. Cl. ................................... 144/34 R; 30/379.5; 83/662; 83/672; 83/928; 144/3 D; 144/336
[58] Field of Search ............ 30/379.5; 144/3 D, 34 R, 144/336; 83/613, 698, 638, 928, 662, 672

[56] References Cited

U.S. PATENT DOCUMENTS

| 3,468,352 | 9/1969 | Larson et al. | 144/3 D |
|---|---|---|---|
| 3,707,175 | 12/1972 | Propst | 144/3 D |
| 3,795,264 | 3/1974 | Coughran, Jr. | 144/3 D |
| 3,805,860 | 4/1974 | Smith | 144/3 D |
| 3,875,983 | 4/1975 | Kurelek | 144/3 D |
| 3,902,538 | 9/1975 | Muiphead . | |
| 3,910,326 | 10/1975 | Tucek . | |
| 4,116,250 | 9/1978 | Ericson . | |
| 4,151,868 | 5/1979 | Fischer . | |
| 4,153,086 | 5/1979 | Oldenburg | 144/3 D |
| 4,446,897 | 5/1984 | Kurelek . | |
| 4,452,286 | 6/1984 | Menzi . | |
| 4,452,287 | 6/1984 | Whitcomb . | |
| 4,491,163 | 1/1985 | Kurelek . | |
| 4,540,033 | 9/1985 | Wehr et al. . | |
| 4,727,916 | 3/1988 | Sigouin . | |

FOREIGN PATENT DOCUMENTS

| 1059408 | 7/1979 | Canada . | |
|---|---|---|---|
| 1135599 | 11/1982 | Canada . | |
| 1140029 | 1/1983 | Canada . | |
| 1214976 | 12/1986 | Canada . | |
| 938838 | 7/1982 | U.S.S.R. | 144/34 R |

Primary Examiner—W. Donald Bray
Attorney, Agent, or Firm—Cushman, Darby & Cushman

[57] ABSTRACT

The present invention relates to a cutting head for use on a tree-felling vehicle. The cutting head comprises a tree-carrying frame with a cutting tool in the form of a rotor with helically extending cutting teeth. An arm for placement against a standing tree to be cut is pivotally mounted to the tree-carrying frame. A fluid ram is connected between the arm and the tree-carrying frame to bring it in engagement with the tree to be cut so that the rotor progressively cuts the tree and the latter enters the tree-carrying frame.

15 Claims, 11 Drawing Sheets

CUTTING HEAD FOR A TREE-FELLING VEHICLE

This is a continuation-in-part of application Ser. No. 107,470, filed Oct. 13, 1987, which was abandoned.

FIELD OF THE INVENTION

The present invention relates to a tree-harvesting apparatus and more specifically to an improved cutting head assembly for use on a tree-felling vehicle.

BACKGROUND OF THE INVENTION

In the past recent years, various types of machines for felling trees have been developed. A typical example is the tree-felling tractor used in large scale tree-harvesting operations, which is a self-propelled all terrain vehicle specifically designed to operate in forest areas under harsh conditions. The vehicle is provided with an articulated boom carrying at its end a cutting mechanism, designated in the art as "cutting head". The articulated boom is hydraulically operated and it can be extended and retracted, raised, lowered or swung through 360 degrees allowing to bring the cutting head against a standing tree to be cut. The cutting head is provided with a cutting tool for cutting the tree, as well with a grappling mechanism to grasp the tree once the cutting phase is completed. The felled tree can then be manipulated to be deposited on the ground or on a trailer for ultimate transportation to a mill.

As it is known to those skilled in the art, efficient operation of the cutting head is essential to obtain good harvesting rates. For that reason considerable efforts have been devoted by the past to the design of a highly efficient cutting head that is reliable, versatile and inexpensive to build and to operate. Among the various designs that have been proposed, the cutting head disclosed in the U.S. Pat. No. 4,446,897 granted on May 8, 1984 to Koehring Canada Limited, has found wide acceptance in the industry. The approach in this patent is to provide a cutting head with a circular saw mounted to a supporting structure that also carries a pair of hydraulically operated arms. In use, the cutting head is placed against a standing tree by swinging sideways the boom of the tree-felling vehicle, and when the cut of the tree is nearly completed, the arms are closed to grasp the tree, which is then carried away.

This prior design has not been completely satisfactory in providing optimum tree-cutting performance at minimum cost. Its main disadvantage is that it is rather heavy and it can be used only with large tree-felling vehicles. Furthermore, it is complex to operate requiring skill and experience from the operator of the machine to close the power arms only when the cutting phase is almost completed. If the arms are closed too early, the tree may splinter because of the high bending efforts exerted by the arms. On the other hand, closing the arms too late results in an inability to retain the tree in the cutting head.

In another known design, the cutting head is equipped with a hydraulically or pneumatically operated shearing device having a pair of knives that shear-off the tree instead of cutting it with a rotary tool. These cutting heads are inexpensive and operate relativeley faster, however, they are known to cause wood splintering especially if the knives do not meet exacly in the same plane, which may be the result of wear or of improper adjustment. The wood splinter damages are to be avoided because the splinted wood portion of the tree must be cut-off and treated as waste.

Generally speaking, the prior designs have not been able to meet all the requirements to ensure an easy and trouble-free operation during adverse tree-harvesting conditions in forest areas.

OBJECT AND STATEMENT OF THE INVENTION

Therefore, an object of this invention is an improved cutting head assembly.

The object of the invention is achieved by providing a cutting head assembly to be mounted on the end of the articulated boom of a tree-felling vehicle, comprising a tree-carrying frame, preferably dimensioned to receive and carry a plurality of felled trees. A cutting tool in the form of an auger-type rotor is mounted in the lower portion of the tree-carrying frame to cut a tree low to the ground for obtaining good wood product recovery.

A grappling arm assembly is mounted to the tree-carrying frame, for placement against one side of a tree to bring the tree-carrying frame and the cutting tool toward the tree. The tree progressively enters the tree-carrying frame as the cutting of the tree proceeds. When the cutting phase is completed, the tree is entirely supported by the tree-carrying frame.

Preferably, a spring biased clamping arm is mounted to the tree-carrying frame to securely hold one or several trees therein when the tree-felling vehicle progresses in the forest area. The clamping arm is designed to move out of engagement with the trees in the tree-carrying frame to allow a freshly cut tree to enter the tree-carrying frame, and then to move back in position to securely clamp the trees.

Therefore, the present invention comprises in a broad aspect a cutting head adapted to be mounted to an end of a boom of a tree-felling vehicle, the cutting head comprising:

- a tree-carrying frame adapted to receive a felled tree;
- an elongated cutting rotor mounted to the tree-carrying frame;
- a pivotal connection for mounting the tree-carrying frame to the end of the boom, the pivotal connection allowing the tree-carrying frame to pivot with relation to the boom about a generally vertical axis;
- an arm for placement against one side of a tree, the arm and the tree-carrying frame being pivotally connected to each other wherein the tree-carrying frame can pivot with respect to the arm about a generally vertical axis; and
- power means operatively connected to the tree-carrying frame to pivot the tree-carrying frame with respect to the boom and to the arm to bring the cutting rotor into engagement with a tree to be felled so that the tree progressively enters the tree-carrying frame while the cutting rotor cuts the tree.

DESCRIPTION OF A PREFERRED EMBODIMENT

Figure 1:
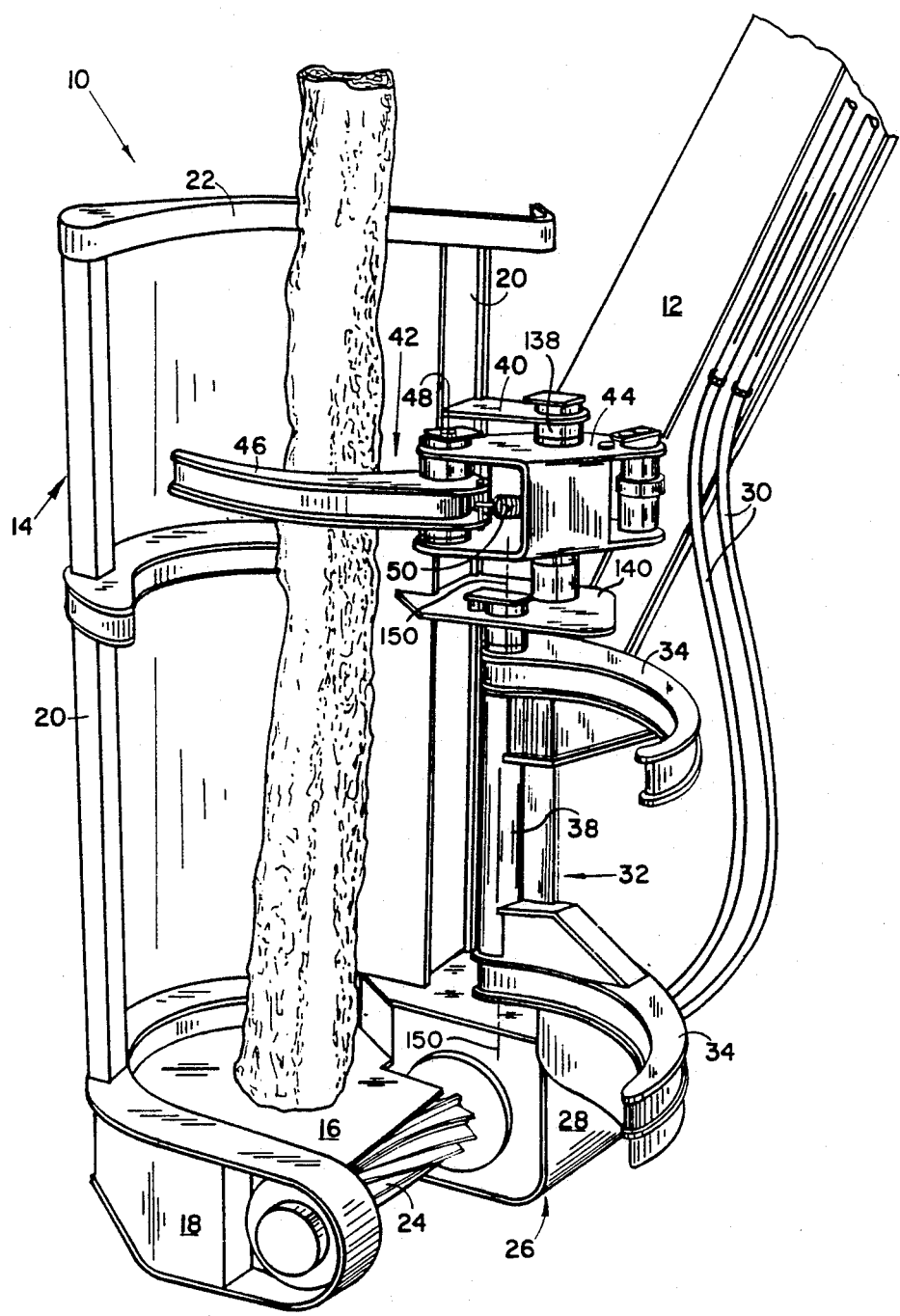
FIG. 1 is a perspective view of a cutting head assembly according to the present invention.

FIG. 1 of the drawings illustrates a cutting head assembly 10 according to the present invention and designated by the reference numeral 10. The cutting head assembly is shown attached to the boom 12 of a tree-felling vehicle which is not illustrated in the drawings and will not be described in detail because such vehicles are well known in the art and do not form part of the present invention.

The cutting head assembly comprises a generally U-shaped tree-carrying frame 14 constructed from metallic members which are assembled by welding or by any other appropriate manner. More particularly, the tree-carrying frame comprises a supporting platform 16 made of heavy gage sheet-metal mounted to a metallic brace 18 to provide rigidity. From the platform 16 project upwardly a pair of elongated hollow members 20 having a rectangular cross-section. To both members 20 are attached a pair of vertically spaced curved supports 22.

A cutting tool in the form of an auger-type rotor 24 with helically extending cutting teeth is mounted to the lower portion of the tree-carrying frame 14, in front of the platform 16. The rotor 24 is journaled to the the brace 18 and it is driven by a hydraulic motor 26 of known construction mounted in a suitable housing 28. Power to the motor 26 is provided by pressurized fluid supplied by flexible lines 30 from the hydraulic circuit of the tree-felling vehicle.

The tree-carrying frame 14 may be manufactured in different sizes, without departing from the spirit of the invention, according to the average trunk diameter of the trees to be cut or according to the number of trees to be received in the tree-carrying frame 14.

The structure of the rotor 24 will be described in detail hereinafter in conjunction with FIGS. 2 and 3.

The tree-carrying frame 14 is pivotally mounted onto a vertical shaft 38 of a grappling arm assembly 32. For that purpose, the shaft 38 is journaled at its lower end to the housing 28 of the motor 26, and at its upper end to a bracket 140 welded to one of the upwardly extending members 20 of the tree-carrying frame 14. The grappling arm assembly 32 also includes a pair of arms 34 secured to the shaft 38.

The grappling arm assembly 32 is connected to the boom 12 of the vehicle by means of a suitable connection (not shown in the drawings) of a type known in the art. This type of connection allows the cutting head to be rapidly removed from the boom 12 for service or for installation to another tree-felling vehicle.

As the grappling arm assembly 32 is connected to the boom 12, and the tree-carrying frame 14 is pivotally mounted onto the vertical shaft 38 of the grappling arm assembly 32, one can appreciate that the shaft 38 constitutes a pivotal connection for mounting the tree-carrying frame 14 to pivot with relation to the boom about a generally vertical axis identified by the reference 150 in FIG. 1, that is the geometrical axis of the shaft 38.

Figure 4:
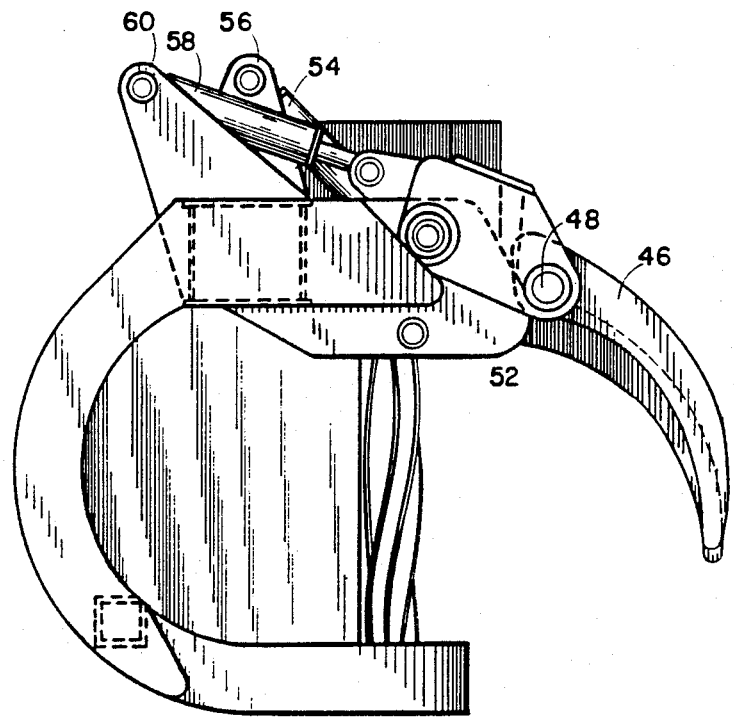
FIG. 4 is a top plan view of the cutting head assembly according to the present invention.

Referring in conjunction to FIGS. 1 and 4, a clamping arm assembly 42 is mounted on a shaft 138 and comprises a bracket 44 rotatably mounted to the shaft 138 between the brackets 40 and 140, and a curved clamping arm 46 mounted for rotation on the bracket 44 about a pin 48. A coil spring 50 having one end attached to the clamping arm 46 and an opposite end secured to the bracket 44 maintains the clamping arm 46 in the position shown in FIG. 1, against a stop 52 formed on the bracket 44. In other words, the clamping arm 46 cannot be rotated about the pin 48, outwardly with respect to the tree-carrying frame 14 because it abuts against the stop 52. However, the clamping arm 46 may be pushed inwardly by extending the spring 50.

The tree-carrying frame 14 may be moved toward and away the tree grappling arm assembly 32 by extending or retracting, respectively, a fluid ram 54 having an end mounted to a bracket 56 welded to the tree-carrying frame 14, and an opposite end mounted to the grappling arm assembly 32. Similarly, the clamping arm assembly 42 may be pivoted on the shaft 138 by a fluid ram 58 having one end mounted to the bracket 44 and an opposite end mounted to a bracket 60 attached to the tree-carrying frame 14 and vertically spaced from the bracket 56.

The fluid rams 54 and 56 are operated by pressurized hydraulic fluid supplied from the hydraulic circuit of the three-felling vehicle, as it is known in the art.

Figure 2:
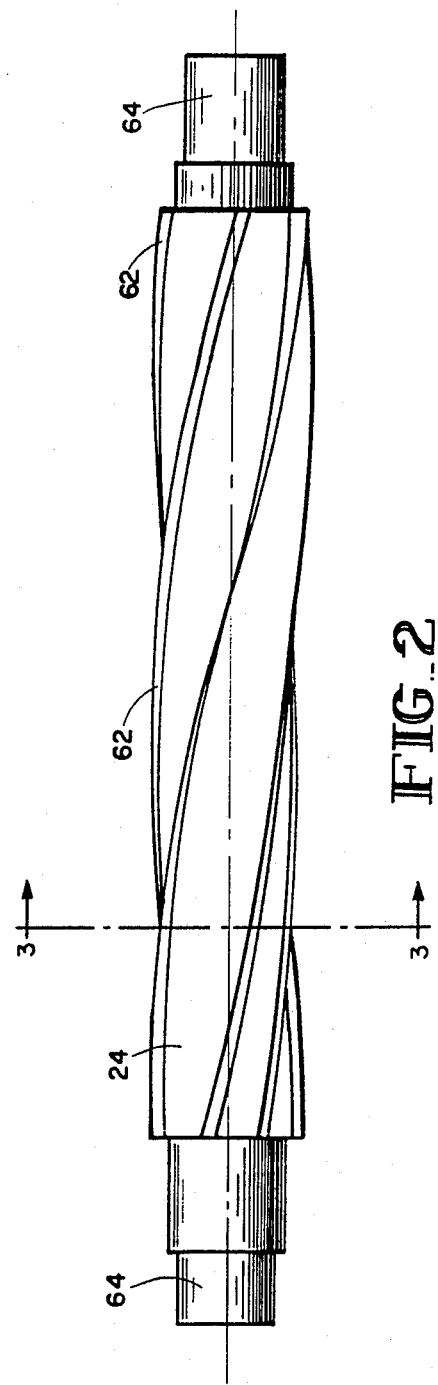
FIG. 2 is an elevational view of rotary cutting tool of the cutting head shown in FIG. 1.
Figure 3:
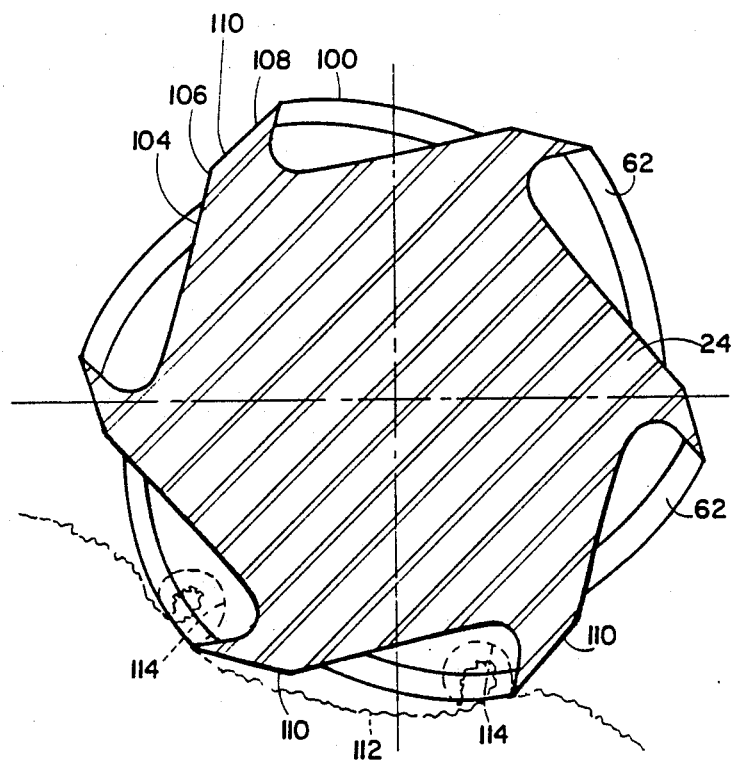
FIG. 3 is a cross-sectional view along lines 3—3 of the cutting tool shown in FIG. 2.

Reference is now made to FIGS. 2 and 3 illustrating in detail the structure of the rotor 24. The rotor 24 is made of metallic material, preferably wear resistant steel and has a generally circular cross-section. The rotor 24 is provided with a plurality of helically extending teeth 62. The end portions 64 of the rotor 24 are machined to fit in respective bearings (not shown) in the brace 18.

The operation of the cutting head 10 according to the invention will now be described in detail with relation to FIGS. 5 to 11.

Figure 5:
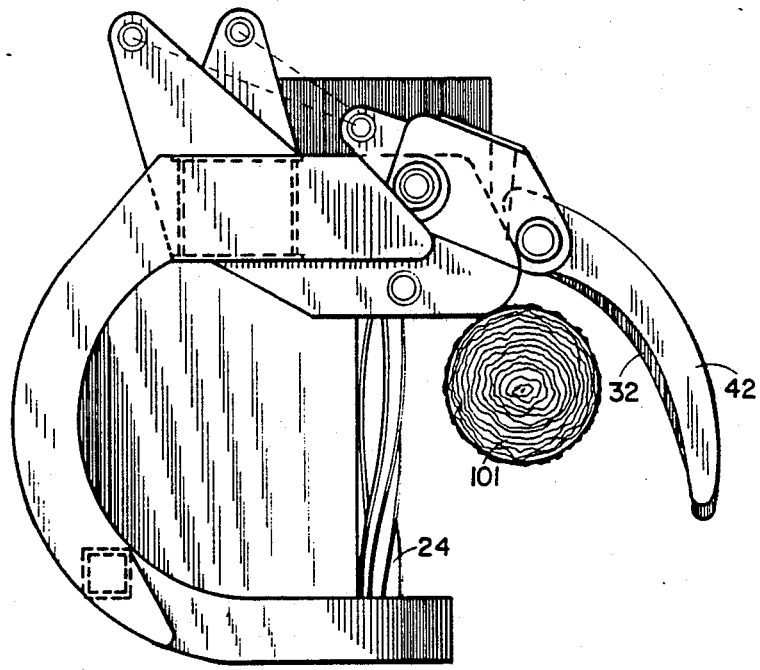
FIGS. 5 to 11 illustrate the operation of the cutting head assembly according to the invention.
Figure 6:
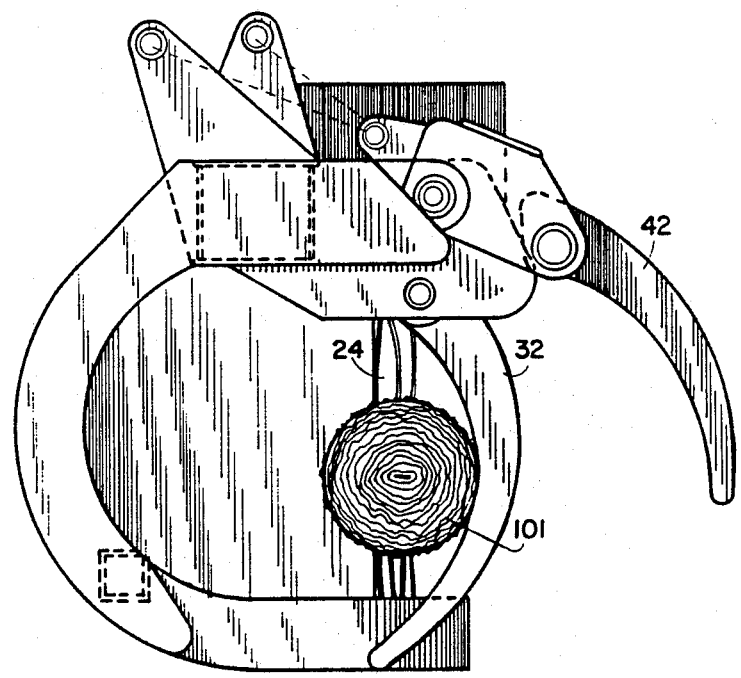
Figure 7:
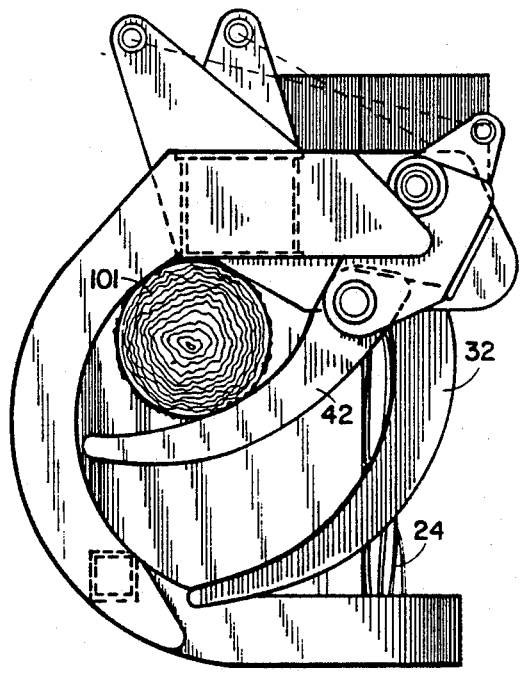

For beginning the tree-harvesting operation, the tree-felling vehicle is driven in position in the forest area near a standing tree 101 to be cut. The boom 12 of the vehicle is extended to bring the cutting head 10 close to the tree 101, the grippling arm assembly 32 and the clamping arm assembly 42 positioned against the tree 101 as shown in FIG. 5. The hydraulic motor 26 is actuated and the fluid ram 54 is extended to bring the tree carrying frame 14 against the tree 101 for engagement with the spinning rotor 24 which progressively cuts the tree 101, as illustrated in FIG. 6. The tree 101 progressively enters the tree-carrying frame 14 while the cutting phase proceeds until the cut is completed and the tree 101 is entirely supported on the platform 16.

The fluid ram 58 is extended to bring the clamping arm 46 toward the tree 101 for securing same in the tree-carrying frame 14.

Figure 8:
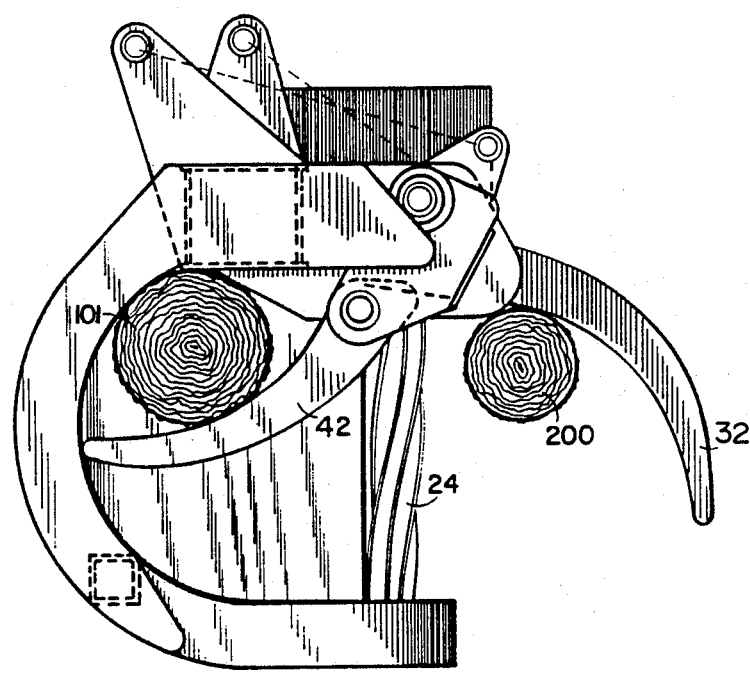
Figure 9:
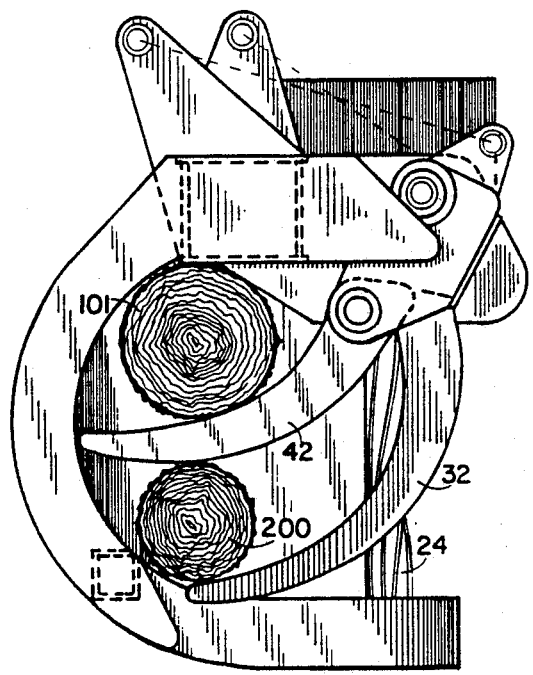
Figure 10:
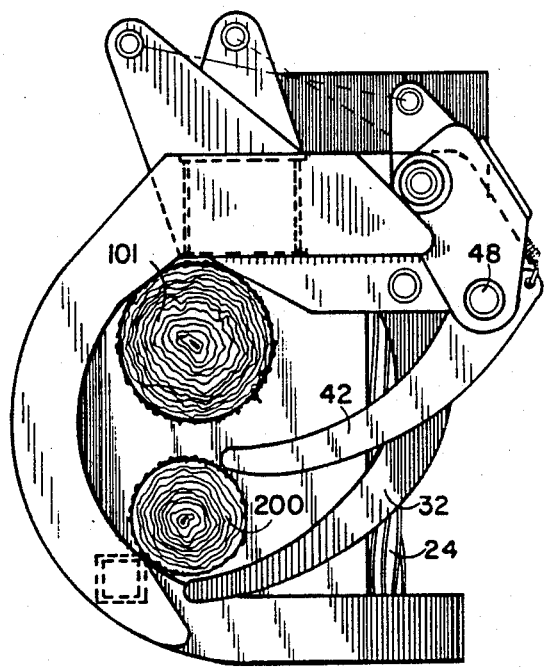
Figure 11:
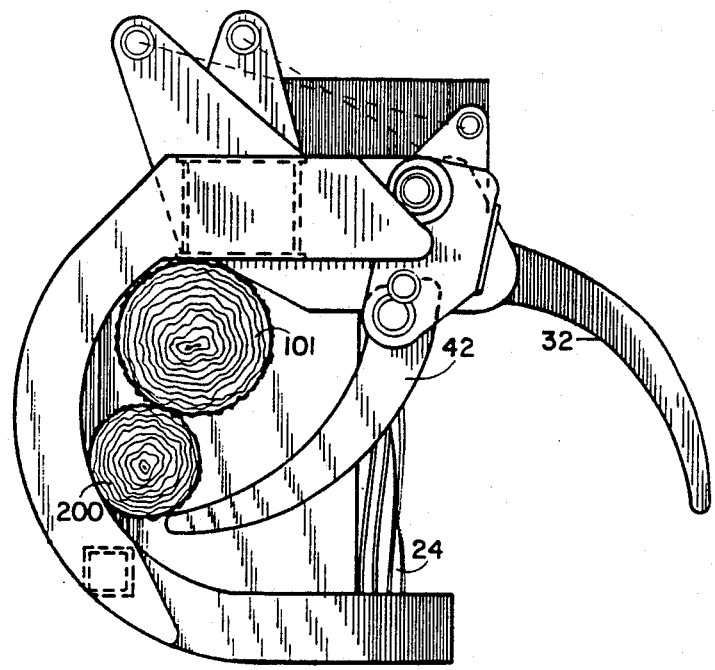

Referring now to FIG. 8, to cut another tree, designated by the reference numeral 200, the grappling arm assembly 32 is opened and the cutting head 10 is moved in position so that the grapping arm assembly 32 is brought against the tree 200. The fluid ram 54 is extended to bring the tree-carrying frame 14 toward the tree 200 which is cut by the rotor 24 and loaded in the tree-carrying frame 14, in position resting between the clamping arm 46 and the grappling arm assembly 32, as exemplified in FIG. 9. The fluid ram 58 is then retracted so that the arm 46 pivots about the pin 48 to clear the tree 200 and to spring back in opened position as shown in FIG. 11.

The same steps are repeated to cut another tree until the tree-carrying frame 14 is filled to capacity.

Although the invention has been described above with respect to one specific form, it will be evident to persons skilled in the art that it may be refined and modified in various ways. It is therefore wished to have it understood that the present invention should not be limited in interpretation except by the terms of the following claims.

I claim:

1. A cutting head adapted to be mounted to an end of a boom of a tree-felling vehicle, said cutting head comprising:
   a tree-carrying frame adapted to receive a felled tree;
   an elongated cutting rotor mounted to said tree-carrying frame;
   a pivotal connection for mounting said tree-carrying frame to said end of said boom, said pivotal connection allowing said tree-carrying frame to pivot with relation to said boom about a generally vertical axis;
   an arm for placement against one side of a tree, said arm and said tree-carrying frame being pivotally connected to each other wherein said tree-carrying frame can pivot with respect to said arm about a generally vertical axis; and
   power means operatively connected to said tree-carrying frame to pivot said tree-carrying frame with respect to said boom and to said arm to bring said cutting rotor into engagement with a tree to be felled so that the tree progressively enters said tree-carrying frame while said cutting rotor cuts the tree.

2. A cutting head, as defined in claim 1, wherein said tree-carrying frame is dimensioned to receive simultaneously a plurality of felled trees.

3. A cutting head as defined in claim 1, wherein said tree-carrying frame comprises means for retaining a felled tree within said tree-carrying frame to prevent unwanted removal of the tree therefrom.

4. A cutting head as defined in claim 3, wherein said means for retaining a felled tree includes a clamping arm pivotally mounted to said tree-carrying frame and being movable between a first position in which said clamping arm engages and retains a felled tree within said tree-carrying frame, and a second position allowing removal of the felled tree from the tree-carrying frame.

5. A cutting head as defined in claim 4, further comprising power means to move said clamping arm from said first position to said second position and vice-versa.

6. A cutting head as defined in claim 4, further comprising biasing means to bias said clamping arm toward said first position.

7. A cutting head as defined in claim 1, further comprising drive means mounted to said tree-carrying frame in driving relationship to said cutting rotor to rotate said cutting rotor about a generally horizontal axis.

8. A cutting head as defined in claim 6, wherein said cutting rotor includes a plurality of helically extending cutting teeth.

9. A cutting head as defined in claim 1, wherein said power means includes a fluid ram.

10. A cutting head as defined in claim 5, wherein said power means to actuate said clamping arm includes a fluid ram.

11. A cutting head as defined in claim 7, wherein said drive means includes a hydraulic motor.

12. A tree-felling vehicle comprising:
    a self-propelled carriage;
    an articulated boom having one end mounted to said self-propelled carriage; and
    a cutting head mounted to an opposite end of said articulated boom, said cutting head including:
    (a) a grappling arm assembly for placement against one side of a standing tree to be cut, said grappling arm assembly being mounted to said opposite end of said articulated boom;
    (b) a tree-carrying frame adapted to receive a felled tree, said tree-carrying frame being pivotally mounted to said grappling arm assembly about a generally vertical axis;
    (c) a rotary cutter mounted to said tree-carrying frame; and
    (d) power means operatively connected to said tree-carrying frame to pivot said tree-carrying frame about said axis toward said arm to bring said rotary cutter into engagement with a tree to be felled so that the tree progressively enters said tree-carrying frame while said rotary cutter cuts the tree.

13. A cutting head adapted to be mounted to an end of a boom of a tree-felling vehicle, said cutting head comprising:
    a grappling arm assembly adapted to be connected to said end of said boom;
    a tree-carrying frame pivotally mounted to said grappling arm assembly about a generally vertical axis, said tree-carrying frame including:
    (a) an elongated cutting rotor mounted to said tree-carrying frame for rotation about a generally horizontal axis; and
    (b) a clamping arm assembly movable between a tree engaging position and a tree release position;
    a fluid ram in operative relation to said tree-carrying frame to pivot said tree-carrying frame toward said grappling arm structure in order to effect engagement between said cutting rotor and a tree to be cut, wherein the tree to be cut progressively enters said tree carrying frame while said cutting rotor cuts the tree.

14. A cutting head as defined in claim 13, wherein said clamping arm comprises power means to move said clamping arm toward said tree release position.

15. A cutting head as defined in claim 13, wherein said clamping arm comprises means to urge said clamping arm toward said tree engaging position.

* * * * *